United States Patent
Curry et al.

[11] Patent Number: 5,978,927
[45] Date of Patent: Nov. 2, 1999

[54] METHOD AND SYSTEM FOR MEASURING A MAXIMUM AND MINIMUM RESPONSE TIME OF A PLURALITY OF DEVICES ON A DATA BUS AND ADAPTING THE TIMING OF READ AND WRITE TIME SLOTS

[75] Inventors: Stephen M. Curry, Dallas; Wendell L. Little, Denton; David A. Bunsey, Jr., Dallas, all of Tex.

[73] Assignee: Dallas Semiconductor Corporation, Dallas, Tex.

[21] Appl. No.: 08/611,036

[22] Filed: Mar. 5, 1996

[51] Int. Cl.[6] ........................................................ G06F 1/04
[52] U.S. Cl. ............................. 713/502; 713/600; 710/60
[58] Field of Search ..................................... 395/557, 559, 395/200.62, 200.63, 200.66, 200.67; 364/551.01; 713/400, 401, 501, 502, 503, 600, 601; 709/232, 233; 710/15, 16, 58, 60

[56] References Cited

U.S. PATENT DOCUMENTS 4,930,093   5/1990   Houser et al. ...................... 364/551.01
5,432,468   7/1995   Moriyama et al. ...................... 327/152

*Primary Examiner*—Dennis M. Butler
*Attorney, Agent, or Firm*—Jenkens & Gilchrist, P.C.

[57] ABSTRACT

In a data bus environment where a host device and a plurality of other devices are connected to the bus, the time required for the first and the last device to respond to a host request is measured. Once the time required between the first and the last response is known, then a read/write window time can be minimized thereby increasing the speed of communication over the data bus.

6 Claims, 1 Drawing Sheet

METHOD AND SYSTEM FOR MEASURING A MAXIMUM AND MINIMUM RESPONSE TIME OF A PLURALITY OF DEVICES ON A DATA BUS AND ADAPTING THE TIMING OF READ AND WRITE TIME SLOTS

CROSS REFERENCE TO RELATED APPLICATIONS

This application is related to the following U.S. Patent Applications:

| J&G DOCKET NO. | TITLE | INVENTOR(S) |
| --- | --- | --- |
| 20661-00465 | Hardware For Verifying Software | Little et al. |
| 20661-00466 | One-Wire Lock Processor System | Curiger et al. |

All of the related applications are filed on even date herewith, are assigned to the assignee of the present invention, and are hereby incorporated herein in their entirety by this reference thereto.

The following applications and patents of common assignee contain related subject matter. All of this related subject matter is hereby incorporated herein by this reference thereto.

| | Title | Inventor(s) |
| --- | --- | --- |
| Ser. No. | | |
| 08/346,556 | Electrical/Mechanical Access Control Systems and Methods | Glick et al. |
| 08/220,425 | Electrical/Mechanical Access Control Systems and Methods | Glick et al. |
| 08/492,660 | Electronic Key with Three Modes of Electronic Disablement | Pearson et al. |
| 08/331,255 | One-Wire Bus Architecture | Lee |
| 08/347,913 | Systems and Methods to Convert Signal Multiplexed on a Single Wire to Three Wire | Lee |
| 08/347,912 | Command Data Protocol | Lee |
| Patent No. | | |
| 5,210,846 | One-Wire Bus Architecture | Lee |
| 5,398,326 | Method for Data Communication | Lee |

BACKGROUND OF THE INVENTION

1. Field of the Invention

The present invention relates generally to techniques for determining and supporting required timing in communications systems. More particularly, the present invention relates to hardware reliant systems for automatically determining and supporting such timing.

2. Description of the Related Art

It is necessary quite often in communications systems to determine and support timing for data transfer. An example of such a circumstance involves the well-known approach for bidirectional communication known as the 1-Wire Protocol developed by Dallas Semiconductor Corporation. The 1-Wire Protocol effects half-duplex serial transfer within discrete time slots. In many cases, the 1-Wire Protocol is used for communication between a "cup shaped" master and a "button shaped" slave. In these cases a microcontroller (as the cup shaped master) initiates data transfer by sending a command word to the button-shaped slave "Touch Memory" portable data carrier.

According to the 1-Wire Protocol, commands and data are sent bit by bit to make bytes, starting with the least significant bit. FIG. 1 illustrates the general characteristics of the communication. The synchronization of master and slave is based on the sharp slope that the master generates by pulling the data line low. This sharp slope is generally indicated by reference numeral 2 (for a write one case) and by reference numeral 4 (for a write zero case) in FIG. 1. A certain time after this slope 2, 4, depending on data direction, either the master or the slave samples the voltage on the data line to get one bit of information. In FIG. 1, the period of time in which voltage may be sampled by the slave can be seen to reside between 15 microseconds after the sharp slope begins and 60 microseconds after that same event. Also, in FIG. 1, the period of time in which the master samples the line is less that 15 microseconds. That is to say, there is a 15 microsecond period before the line is pulled high in the write one case where a sampling would not result in a correct reading of a one; and further, there is a 60 microsecond limit on an active time slot before a next bit begins. The foregoing method of operation is called data transfer in time slots. Each time slot is independently timed so that communication pauses can occur between bits if necessary, without causing errors.

It has been found in practice that while the scheme described above and depicted in FIG. 1 provides a 45 microsecond window during which voltage can be sampled during a data transfer, many 1-Wire systems exist where virtually all sampling is done at about 30 microseconds after the sharp slope begins. In both systems having one slave and those having multiple slaves, it has been found rare in practice where sampling occurs much outside a range of about 27–33 microseconds after the line is first pulled low by the master to initiate and synchronize a bit. For example, whereas in theory master writing is limited by the maximum time of 60 microseconds (i.e., slowness could be a problem) and master reading is limited by the minimum time (i.e., fastness could be a problem), the fact remains that very little voltage sampling is done at the active time slot extremes.

It should be appreciated that maintaining a window of opportunity larger than is absolutely necessary reduces the speed of data transfer. It would be a tremendous advance in the art, therefore, to have a scheme in which the window of opportunity for voltage sampling is optimized, that is, made small enough so that accuracy is maintained, while obtaining marked improvements in speed of transfer.

Still further, recognizing the timing optimizing schemes can be effected in hardware, in software, or in a combination of the two, it should also be appreciated that it would be extremely desirable to have a scheme in which all components (whether hardware or software) are used efficiently and so to play to strengths.

SUMMARY OF THE INVENTION

The present invention provides a timing optimizing scheme that addresses various shortcomings and provides various advances discussed above. According to the teachings of the present invention, a programmable adaptive timing scheme including the steps of determining a slowest workable response time, determining a fastest workable response time, and generating time slots that accomodate both the slowest and fastest workable response times.

The present invention also provides a system including means for performing the steps listed above.

BRIEF DESCRIPTION OF THE DRAWINGS

Other advantages and novel features of the present invention will become apparent from the following detailed description of the invention when considered in conjunction with the accompanying drawings in which.

DETAILED DESCRIPTION

Set forth below is a detailed description of how the scheme of the present invention may be applied in a processor that uses the well-known Dallas Semiconductor 1-Wire protocol. This description is intended to present one example only of application of the teachings of the present invention. The present invention may well obviously be applied in a multitude of different applications, under a multitude of varying circumstances. The invention, therefore, is intended to be limited only by the appended claims.

Figure 1:
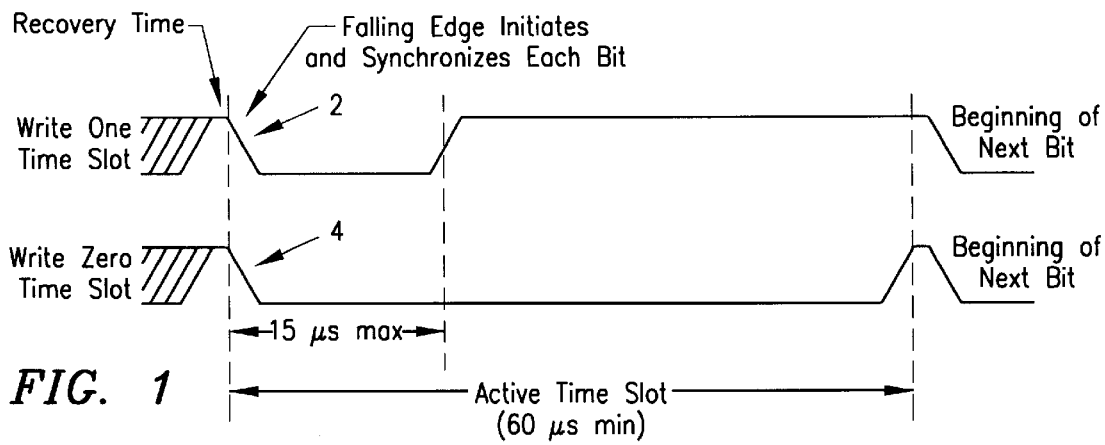
FIG. 1, previously discussed, illustrates the general characteristics of 1-Wire communication.
Figure 2:
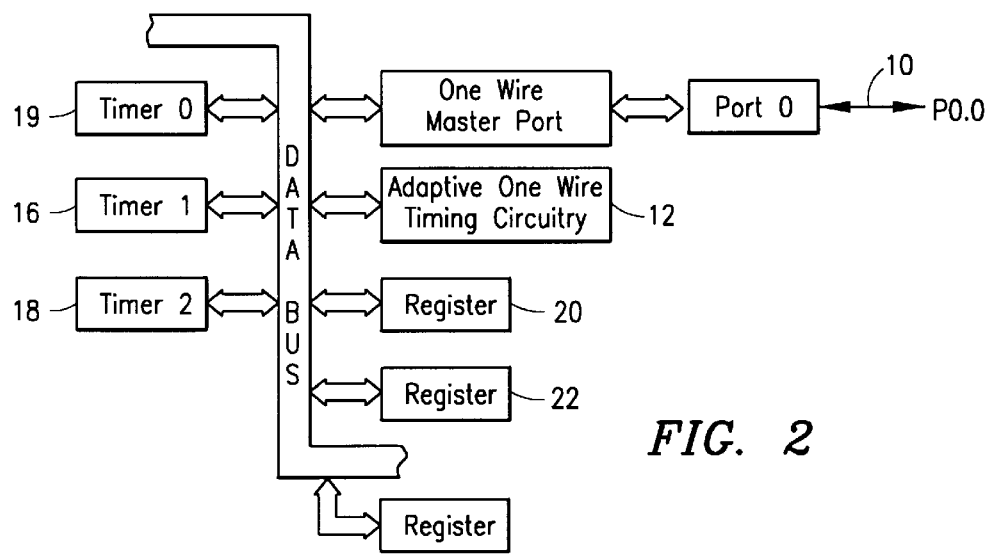
FIG. 2 is a block diagram of a system designed to practice the method of the present invention.

Referring now to the drawings, there is depicted in FIG. 2 a portion of a microcontroller/processor developed by Dallas Semiconductor Corporation. This processor includes a pin PO.O 10 through which master 1-Wire control can be provided. Pin 10 is initialized after reset to function as a general single bit I/O port. In this standard I/O mode, pin 10 can be used as a software timed 1-Wire controller.

While software run by a system controller could effect the adaptive timing scheme disclosed herein, to reduce the software overhead associated with the 1-Wire protocol, the processor depicted in FIG. 2 includes actual adaptive 1-Wire timing circuitry 12 to automatically determine and support the required timing necessary to establish 1-Wire timing slots.

The system depicted in FIG. 2 also includes timers 19, 16, 18, a first register 20, and a second register 22. A bit in the register 20 can be used to enable use of the timers 19, 16, 18.

The adaptive 1-Wire timing circuitry 12 provides automated control of the 1-Wire master. The circuitry 12 performs two functions: "1-Wire reset" and "1-Wire reads/writes". Further details regarding these two functions are set forth hereinbelow.

It should be recognized that the purpose of adaptive timing is to "learn" when voltages are sampled in a given system, and to use that learned information to construct a smaller, more efficient, "tailored" window for data transfer.

With the foregoing in mind, with regard to the embodiment of the instant invention depicted in FIG. 2, in order to apply adaptive timing on the 1-Wire line, a user must first issue a 1-Wire master reset. In an actually implemented embodiment of the present invention, issuing a 1-Wire master reset is a several step process. First, before the reset is issued, the clock sources for the timers 19, 16, 18 are established by disabling all the timers and by setting an "Enable Master 1-Wire Adaptive Timing" ("EMAT") bit in a 1-Wire control register, e.g., register 20. This guarantees that the timers will not start running until all of the modes and pre-loaded timer values have been properly established.

After the EMAT bit is set, the timers must be set to various proper modes. The timers are, for example, 16-bit timers able to use a divide by twelve clock source, or to use a divide by four relationship. Timers T0 19 and T1 16 should be set to use a machine cycle rate, and timer T2 18 set to an automatic reload mode. Additionally, any associated timer flags should be cleared at this time. In the actually implemented embodiment of the present invention, the user also should disable the T1 16 interrupt at this time, because it is not used on adaptive reset timing. A 1-Wire Master Interrupt is designed to indicate when the reset is finished. It is also recommended in use of the actually implemented embodiment of the present invention to incorporate a Watchdog Timer Interrupt, a Timer T0 19 interrupt and a timer T2 18 interrupt to allow the microcontroller to detect various 1-Wire conditions, discussed further below.

As a next step in the issuing of a 1-Wire master reset, the correct value for a reset pulse of $\geq 480$ microseconds (for standard 1-Wire timing; or a reset time between 48 and 128 microseconds for overdrive) is loaded into T2 18. In the actually implemented embodiment of the invention, timers T0 and T1 are programmed with 00 Hex. The timers are then enabled using appropriate bits in associated registers.

When all of the foregoing is completed, setting a "Master 1-Wire Reset" bit in a "1-Wire Master Control" register, e.g., register 22, will cause a 1-Wire master reset.

Figure 3:
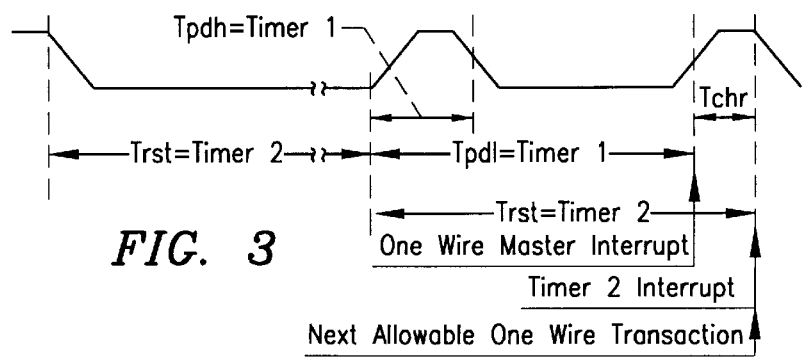
FIG. 3 is a timing diagram depicting key events and relationships in the adaptive reset (learning mode)
Figure 4:
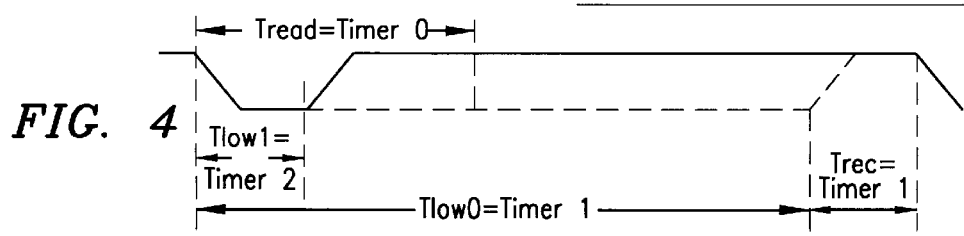
FIG. 4 is a timing diagram depicting key events and relationships in adaptive read/write timing.

A 1-Wire master reset at this point will trigger a set of events best understood with reference to FIG. 3. The circuitry first pulls the PO.O line low for the amount of time in timer T2 18, then it will release the 1-Wire line. 1-Wire slaves on the line will then respond with a low pulse of 4T (with T equaling the intrinsic period of the slave), after waiting for 1 T. On the release of the 1-Wire line by the master, timers T0 19 and T1 16 will start counting. Timer T0 19 will stop when the first slave pulls the line low, and Timer T1 16 will stop when the last slave releases the 1-Wire line. Once the timers are stopped and have captured Tpdh (by timer T0) and Tpdl (by timer T1) values, a 1-Wire Master Interrupt is issued, letting the user know that the reset is finished. All of the foregoing is depicted in FIG. 3.

There are four different 1-Wire conditions that can be encountered during the 1-Wire reset process: (1) No port-no response to the 1-Wire reset issued by the master; (2) One or more ports on the 1-Wire line-no 1-Wire ports with alarm; (3) a 1-Wire short; or (4) One or more ports on the 1-Wire line-one or more 1-Wire ports with alarm. Each of these possible conditions is discussed in an individual paragraph immediately below.

The "No port-no response to 1-Wire reset issued by master" condition considers the case when a 1-Wire Reset is issued by the master and no response is returned by a slave. Under normal conditions with a proper response from a slave, timer T0 19 would stop counting when PO.O 10 is forced low by the slave. With no response by the slave, timer T0 19 will roll over. By enabling the timer T0 19 interrupt, it is possible for software to use the timer T0 19 interrupt as an indication that no slaves exists on the line.

The "One or more ports on the 1-Wire line-no 1-Wire ports with alarm" condition is considered the normal operating mode. When the master issues a 1-Wire Reset one or more slaves respond by pulling the line low after a prescribed time following the release of the line by the master. In this mode timer T0 19 will capture the time from when the master releases the line to when the fastest slave pulls the line low. Timer T1 16 will capture the time required for the slowest slave to release the line. When properly programmed neither timer T0 or timer T1 will roll over. The end of the 1-Wire single bit communication can be determined by either using the 1-Wire master interrupt or by using the second roll over of timer T2 (T2 interrupt or poll TF2 flag). The 1-Wire master interrupt occurs at the same time that timer T1 16 has completed the capture of the Tpdl time period. It must be noted that additional time must be allotted to the 1-Wire slave after it releases the line to allow it to recharge parasitically. This time Tchr can either be calculated (as an ideal value) as a function of the timer T1 16 captured value or fixed to a safe but slightly longer time established by the second roll over of timer T2 18.

The "1-Wire short" condition considers the case when a 1-Wire reset is issued by the master and the line remains low due to an electrical short. Since the line is never allowed to return to a high, clocks are not furnished to either timer T0 19 or timer T1 16. As a result there will be no interrupt via either TF0, TF1, or the 1-Wire Master Interrupt. To determine the possibility of having a short the system must establish that a watchdog timer interrupt occured without having had a 1-Wire master interrrupt.

The "One or more ports on the 1-Wire line-one or more 1-Wire ports with alarm" condition is considered as an extension to the normal operating mode. When the master issues a 1-Wire Reset one or more slaves respond with an alarm by holding the line low after the Master has released the line from the initial Reset pulse. The circuits associated with the adaptive timing will allow this time (approximately a minimum of 960 us) to pass without starting timers T0 19 and T1 16. Once the alarm function has released the line to return to a high the adaptive timing circuits will begin capturing the values in T0 19 and T1 16 as in the non-alarm mode. The system may determine that an alarm condition exits when a 1-Wire master interrupt occurs after the second T2 interupt and the 1-Wire master interrupt occurs before a watchdog timer interrupt.

Once the "Adaptive Learning Mode" associated with the 1-Wire Reset is completed all three timers must be disabled via their respective TR1, TR2, and TR2 bits. The values in the timers are now used to set up adaptive timing for read and writes on the 1-Wire line.

The captured value in timer T0 19 is the intrinsic period of the fastest 1-Wire slave, and will be used to set up the timing of a 1-Wire read, to increase reliability of reading a correct "1" on the line. To provide timing margin the value in T0 19 is decremented by 02 Hex (approximately 1 us at an 8 MHZ Xtal 1 clock). This value is then subtracted from FF Hex and reloaded back into T0 19 to provide the required count down value to be used in the read/write communications.

The captured value in timer T1 16 is five times the intrinsic period of the slowest 1-Wire slave, and must be divided by five to get the value of the slowest period on the 1-Wire. This value will be used to control the speed of 1-Wire communications, the slowest slave being the bottleneck. When writing a "O" on the line, the line must be held low for at least the period of the slowest slave. Similar to the value in timer T0 19, the result of the divide by five of the T1 value, is then incremented by 01 Hex (approximately 1.5 us at an 8 MH Xtal 1 clock) to provide timing margin. This value is subtracted from FF Hex and reloaded back into timer T1 16 to provide the required count up value to be used in the read/write communications.

Timer T2 18 takes on a different timing role in the 1-Wire read/write mode and must be loaded with the time of the initial low pulse which occurs on all communications. This is 1<=Tlow1<=15 us for standard timing, or 1<=Tlow1<=2 us for Overdrive timing. The value in timer T2 18 is also used to provide the recovery time at the end of every read/write. Following the loading of all of the timers each timer is re-enabled via their respective TR1, TR2, and TR2 bits.

To initiate a 1-Wire read or write, the user needs only to write to Port 0.0 10 to initiate a 1-Wire transmission. This will start the timing on the 1-Wire line, using the values loaded in the timers to establish the 1-Wire timing. When issuing reads, the user should enable the Timer T0 19 interrupt, as this interrupt will indicate when data is ready to be read from the port. A read is initiated by writing a 1 to Port 0.0 10 and waiting for a Timer T0 19 interrupt. At this time, the user should read Port 0.0 10 to obtain the incoming data and then clear the flag associated with the Timer T0 19 interrupt. Once the 1-Wire Master has completed a read/write of the line, a 1-Wire Master Interrupt (OWMI) is issued, to notify the user that the complete transmission is finished.

A write oriented holding buffer may also be supplied to Port 0.0 10 to improve the overall efficiency of the 1-Wire master. This buffer can support only the 1-Wire master and is not available on the standard 1/0 port function. The holding buffer allows software to write the next bit to the 1-Wire master port 0.0 10, before the timing has completed the transmission of the previous bit. A single write may be issued during a current write, and will be executed immediately following the active one. In this way, maximum throughput may be achieved by not having the user wait until a transmission is finished before sending the next bit.

The time of a read/write is established as (2*(Timer 2)+Timer 0). This is the limiting speed of 1-Wire Master Adaptive communication.

Summarizing all of the foregoing in the particular-1-Wire-environment in which it is discussed herein, it should be understood and appreciated that adaptive timing involves a presence signal, received from a 1-Wire bus during a reset sequence, being used to optimize the timing for communication with the particular devices connected on the bus. Information for optimizing is derived from measurements of the length of time between the rising edge of the reset signal and the beginning of the presence pulse and the length of the presence pulse itself.

An advantage of adaptive timing is that with a "typical" Touch Memory system with an internal time base of 30 microseconds, adaptive timing allows communication at approximately twice the non-adaptive rate, and also allows approximately twice the recovery time to overcome the effect of long-line capacitance, thereby increasing the reliability of long-line communication. When multiple Touch Memories are on a 1-Wire bus, the time base of the slowest part and the time base of the fastest part can be calculated from the measured times. The time base of the slowest part limits the data transmission rate, whereas the time base of the fastest part limits the signal recovery time (non-adaptive procedures assume the worst-case range of 15 to 60 microseconds for the internal time base). Adaptive procedures become identical to non-adaptive procedures when connected to a 1-Wire bus having both a 15 microsecond and a 60 microsecond Touch Memory. When adaptive timing is used, timing may be recalibrated after every reset pulse to insure that the communication to follow is correctly timed.

Based upon the foregoing, it should now be understood and appreciated that the present invention provides a scheme in which windows of opportunity for voltage sampling is optimized, that is, made small enough so that accuracy is maintained, while obtaining marked improvements in speed of transfer. It should also be understood and appreciated that the present invention provides a heavily hardware-reliant scheme, thereby reducing software overhead, a desirable goal in many systems.

Although a preferred embodiment of the method and apparatus of the present invention has been illustrated in the accompanying drawings and described in the foregoing detailed description, it will be understood that the invention is not limited to the embodiment disclosed, but is capable of numerous rearrangements, modifications and substitutions without departing from the spirit of the invention as set forth and defined by the following claims.

What is claimed is:

1. A method for optimizing communication timing between a master device and a plurality of devices over a data bus comprising the steps of:

sending a first signal from said master device to said plurality of devices;

starting a first timer and a second timer;

determining a slowest response completion time of said plurality of devices;

determining a fastest response time of said plurality of devices; and generating a maximum required communication time that will accommodate both the fastest response time and the slowest response completion time of said plurality of devices.

2. The method for optimizing communication timing of claim 1, wherein said data bus is a one-wire data bus and wherein said first signal is a reset signal.

3. The method for optimizing communication timing of claim 1, wherein said step of determining the slowest response completion time includes a step of stopping said first timer when a last one of said plurality of devices allows a voltage on said data bus to go high.

4. The method for optimizing communication timing of claim 1, wherein said step of determining the fastest response time includes a step of stopping said second timer when a first one of said plurality of devices pulls a voltage on said data bus high.

5. A host device having a communication optimizing circuit for minimizing the amount of time the host device waits to receive a response from a plurality of slave devices, said communication optimizing circuit comprising:

a timer circuit for measuring a fastest response time of a first one of said plurality of slave devices;

a timer circuit for measuring a slowest response time of a second one of said plurality of slave devices; and circuitry for establishing a minimum time slot size that accommodates both the fastest response time and the slowest response time of said first and said second ones of said plurality of said slave devices.

6. An integrated circuit for communicating over a single wire data bus comprising:

a master port for communicating with a plurality of devices connected to said single wire data bus;

a first timer for determining the amount of time that elapses between when said master port sends a first signal on said data bus and when a first one of said plurality of devices responds to said first signal;

a second timer for determining the amount of time that elapses between when said master port sends said first signal on said data bus and when a last one of said plurality of devices completes a response to said first signal; and means for reading said first and second timers and determining an optimized communication timing window of time taking into account the time required for said first one of said plurality of devices to respond to said first signal and the time required for said last one of said plurality of devices to complete its response to said first signal.

* * * * *